(12) United States Patent
Lum

(10) Patent No.: US 7,712,797 B2
(45) Date of Patent: May 11, 2010

(54) UNIVERSAL FLUID COUPLING ASSEMBLY WITH INTERCHANGEABLE FITTING MEMBERS

(75) Inventor: Ken Lum, Fresno, CA (US)

(73) Assignee: Grundfos Pumps Corporation, Olathe, KS (US)

( * ) Notice: Subject to any disclaimer, the term of this patent is extended or adjusted under 35 U.S.C. 154(b) by 691 days.

(21) Appl. No.: 11/476,272

(22) Filed: Jun. 28, 2006

(65) Prior Publication Data

US 2007/0080311 A1 Apr. 12, 2007

Related U.S. Application Data

(63) Continuation-in-part of application No. 11/246,991, filed on Oct. 7, 2005.

(51) Int. Cl.
*F16L 23/00* (2006.01)
(52) U.S. Cl. .................. 285/414; 285/412; 285/368; 285/388
(58) Field of Classification Search .......... 285/414, 285/412, 368, 387, 388, 415
See application file for complete search history.

(56) References Cited

U.S. PATENT DOCUMENTS

| | | | | |
|---|---|---|---|---|
| 112,958 | A * | 3/1871 | Ramp | 285/391 |
| 791,705 | A * | 6/1905 | Lees | 285/387 |
| 924,039 | A * | 6/1909 | Clark | 285/10 |
| 1,186,325 | A * | 6/1916 | Metzger | 285/388 |
| 1,232,129 | A * | 7/1917 | Wafer | 285/386 |
| 2,033,122 | A | 3/1936 | Cornell Jr. | |
| 2,192,962 | A * | 3/1940 | Dalzell | 285/387 |
| 2,353,012 | A * | 7/1944 | Cheney | 285/387 |
| 2,653,834 | A | 9/1953 | Purkhiser | |
| 3,404,902 | A | 10/1968 | Bollfrass et al. | |
| 3,575,675 | A * | 4/1971 | Hirsch et al. | 333/254 |
| 3,744,755 | A | 7/1973 | Gary, Jr. et at | |
| 4,007,953 | A * | 2/1977 | Powell | 285/321 |
| 4,089,345 | A | 5/1978 | Eberhardt | |
| 4,372,529 | A * | 2/1983 | Kato | 251/151 |

(Continued)

FOREIGN PATENT DOCUMENTS

EP 527090 A1 * 2/1993

*Primary Examiner*—David E Bochna
(74) *Attorney, Agent, or Firm*—Small Patent Law Group; Dean D. Small; Jay J. Hoette

(57) ABSTRACT

An universal fluid coupling assembly is provided that includes a coupler housing that has an inner bore extending along an axis of, and opening onto a mating end of, the coupler housing. The coupler housing has an outer perimeter that includes an outer coupler flange that extends about the outer perimeter and that is located proximate to the mating end. The outer coupler flange has a periphery that follows a predetermined circumferential envelope and that has at least one discontinuity therein to define a blank area in the envelope. The assembly further includes a fitting member with an aperture there through. The aperture has an inner diameter that is smaller than the circumferential envelope of the outer coupler flange. The fitting member is loaded over the outer coupler flange onto the outer perimeter of the coupler housing by orienting the fitting member in a non-orthogonal relation with the coupler housing such that the outer coupler flange passes through the aperture. The circumferential envelope of the outer coupler flange may be generally circular, with the discontinuity including at least one flat cut across a portion of the circumferential envelope to define the blank area.

36 Claims, 12 Drawing Sheets

U.S. PATENT DOCUMENTS

| | | | |
|---|---|---|---|
| 4,516,278 A * | 5/1985 | Lamond | 4/679 |
| 4,582,444 A * | 4/1986 | Miskinis | 403/16 |
| 4,676,479 A * | 6/1987 | Ogawa et al. | 251/151 |
| 4,702,500 A | 10/1987 | Thau et al. | |
| 4,767,138 A | 8/1988 | Schafbuch | |
| 5,803,513 A | 9/1998 | Richardson | |
| 5,836,570 A | 11/1998 | Blenkush et al. | |
| 6,158,782 A | 12/2000 | Stanley et al. | |
| 6,276,726 B1 | 8/2001 | Daspit | |
| 6,299,127 B1 | 10/2001 | Wilson | |
| 6,299,219 B1 | 10/2001 | Hoegger | |
| 6,575,429 B2 | 6/2003 | Paine | |
| 6,715,802 B2 | 4/2004 | Baker | |
| 6,935,613 B1 | 8/2005 | Ward | |
| 7,258,372 B2 * | 8/2007 | Kronmeyer | 285/387 |

* cited by examiner

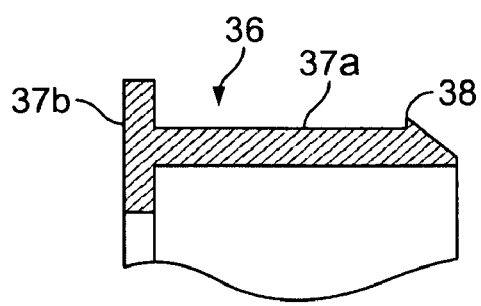
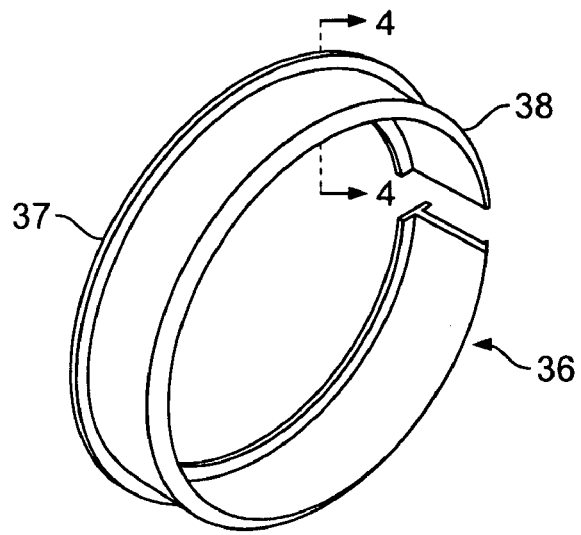
FIG. 4  FIG. 5
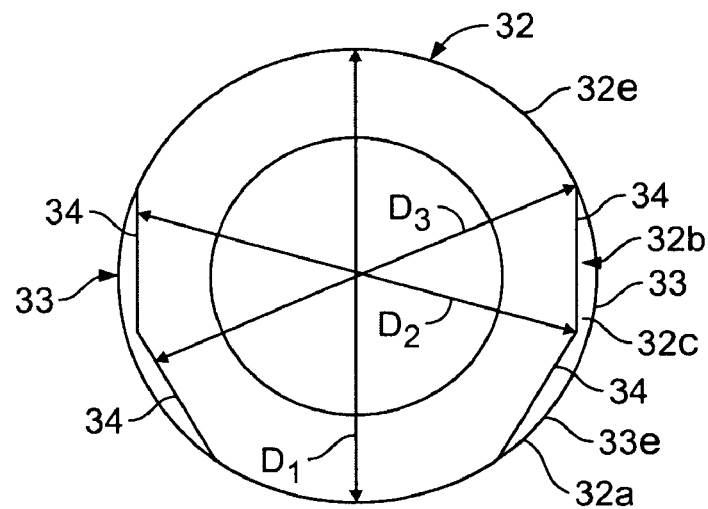
FIG. 7

UNIVERSAL FLUID COUPLING ASSEMBLY WITH INTERCHANGEABLE FITTING MEMBERS

CROSS REFERENCE TO RELATED APPLICATIONS

The present application is a continuation in part, and claims priority from, U.S. application Ser. No. 11/246,991, filed Oct. 7, 2005 and entitled "Electrolysis-Resistant Coupling Assembly for Valves", the complete subject matter of which is expressly incorporated herein by reference in its entirety.

BACKGROUND OF THE INVENTION

The present invention generally relates to fluid coupling assemblies and more particularly to a universal fluid coupling assembly that supports interchangeable fittings of different types to be used with a common housing based upon the type of mating coupling.

Today, a wide variety of coupling assemblies are used in fluid distribution systems. The coupling assemblies may be provided alone, or on various equipment, such as pumps, valves, circulators, meters and the like. Each type of coupling assembly is configured for use with a particular type of fluid, such as water, oil, fuel, sewage and the like. Examples of existing coupling types include flange fittings, threaded union fittings, sweat fittings, and NPT fittings.

For historic reasons, different applications have used certain types of couplings, regardless of whether such coupling remains today to be the most convenient for the application. Also, different geographic areas (e.g. different countries) may predominantly use certain types of couplings for a given application. For example, in Europe, a certain groundwater applications may utilize one type of coupling (e.g. a threaded union), while, in United States, the same groundwater application may utilize a different type of coupling (e.g. a flange).

For convenience, it is generally preferred to continue to use the same type of coupling that has historically been used in a certain application and geographic area. Continuity of use of the traditional coupling limits the need for plumbing to convert between different coupling types, as well as reduces the number of different types of couplings that an individual may need to carry or stock. Otherwise, one individual would be required to carry in stock numerous different types of couplings, where each type of coupling included a separate and dedicated overall structure. Consequently, it was unduly expensive to fully stock a wide variety of couplings and not practical for the "do it yourself" market or smaller contractors.

In recent times, more interest has been given to simplify the structures of, and steps for installing, fluid distribution systems and plumbing. The growing interest to simplify these systems and plumbing is due, in part, to the desire of contractors to improve efficiency and reduce inventory and, in part, due to the interest of individuals to perform more home repair and improvement.

A need remains for an universal coupling assembly that may be used in different applications and with different types of mating connectors. It is an object of certain embodiments of the present invention to address the above concerns and other problems experienced heretofore.

BRIEF DESCRIPTION OF THE INVENTION

In accordance with certain embodiments, an universal fluid coupling assembly is provided that includes a coupler housing that has an inner bore extending along an axis of, and opening onto a mating end of, the coupler housing. The coupler housing has an outer perimeter that includes an outer coupler flange that extends about the outer perimeter and that is located proximate to the mating end. The outer coupler flange has a periphery that follows a predetermined circumferential envelope and that has at least one discontinuity therein to define a blank area in the envelope. The assembly further includes a fitting member with an aperture there through. The aperture has an inner diameter that is smaller than the circumferential envelope of the outer coupler flange. The fitting member is loaded over the outer coupler flange onto the outer perimeter of the coupler housing by orienting the fitting member in a non-orthogonal relation with the coupler housing such that the outer coupler flange passes through the aperture. The circumferential envelope of the outer coupler flange may be generally circular, with the discontinuity including at least one flat cut across a portion of the circumferential envelope to define the blank area.

Optionally, the circumferential envelope may have a diameter across a first area that is larger than the inner diameter of the aperture and a diameter across a second area that is smaller than the inner diameter of the mounting aperture. The fitting member may constitute one of a flange type fitting, a threaded union type fitting, a sweat type fitting and an NPT type fitting. Optionally, multiple fitting members may be provided with a common coupler housing where one of the fitting members is loaded onto the coupler housing. The multiple fitting members may include different types of fittings, such as from the group including a flange type fitting, a threaded union type fitting, a sweat type fitting and an NPT type fitting. Optionally, a captive ring may be loaded over the outer coupler flange and positioned to engage a back face of the outer coupler flange and to be sealably secured between the outer coupler flange and the fitting member. The captive ring is loaded over the outer coupler flange. The captive ring has a cross-section with a base portion and a top portion, where the base portion fits over an outer perimeter of the coupler housing and against the outer coupler flange, while the top portion engages a rim formed about the aperture to hold the fitting member on the outer coupler flange.

In accordance with an alternative embodiment, a method is provided for configuring a fluid coupling assembly for installation in a fluid distribution system based on a type of mating coupling. The method includes providing a coupler housing having an inner bore that extends along an axis and opens onto a mating end of the coupler housing. The coupler housing has an outer perimeter that includes an outer coupler flange that extends about the outer perimeter and that is located proximate to the mating end. The outer coupler flange has a periphery that follows a predetermined circumferential envelope that has at least one discontinuity that defines a blank area in the envelope. The method further comprises providing the fist and second fitting members what may be selectively mounted on the outer perimeter of the coupler housing. An aperture extends though each of the fitting members and has an inner diameter that is smaller than the circumferential envelope of the outer coupler flange. The first fitting member constitutes one of a union-type, a flange-type, a sweat-type and an NTP-type fitting, while the second fitting member constitutes a different one of a union-type, flange-type, sweat-type and NTP-type fitting. Both of the first and second fitting members are configured to be used with the same coupler housing. The method includes selecting one of the first and second fitting members for use with the coupler housing based on the type of mating coupling to be joined thereto. The selected one of the first and second fitting members is then loaded over the outer coupling flange onto the outer perimeter of the coupler housing by first orienting the selected one of the first and second fitting members in a non-orthogonal relationship with the coupler housing to permit the outer coupler flange to pass through the aperture.

Optionally, the method may include forming the predetermined circumferential envelope to be generally circular and the discontinuity to include at least one flat edge cut across a portion of the circumferential envelope to define the blank area. Optionally, after the selected one of the first and second fitting members is loaded onto the coupler housing, a captive ring is then loaded over the outer coupler flange and the selected fitting member is drawn up onto the captive ring to seat the captive ring against the outer coupler flange within the aperture of the fitting member. Optionally, the coupler housing may initially be provided with the second fitting member where the method further comprises removing, from the coupler housing, the second fitting member which is a flange type fitting. The flange type fitting includes a flange body that is removed by orienting the flange body in a non-orthogonal relation with the axis of the coupler housing. Optionally, the method may include switching between first and second types of fittings by removing the first fitting member from the outer coupler flange and mounting the second fitting member over the outer coupler flange.

BRIEF DESCRIPTION OF THE DRAWINGS

FIG. 4 is a cross-sectional view, taken on the line 4-4 in FIG. 5;

FIG. 5 is a perspective view of the split ring, taken to an enlarged scale;

FIG. 7 is a front elevational view of the valve coupler, showing the outer coupler flange and the inner coupler flange;

DETAILED DESCRIPTION OF THE INVENTION

Figure 1:
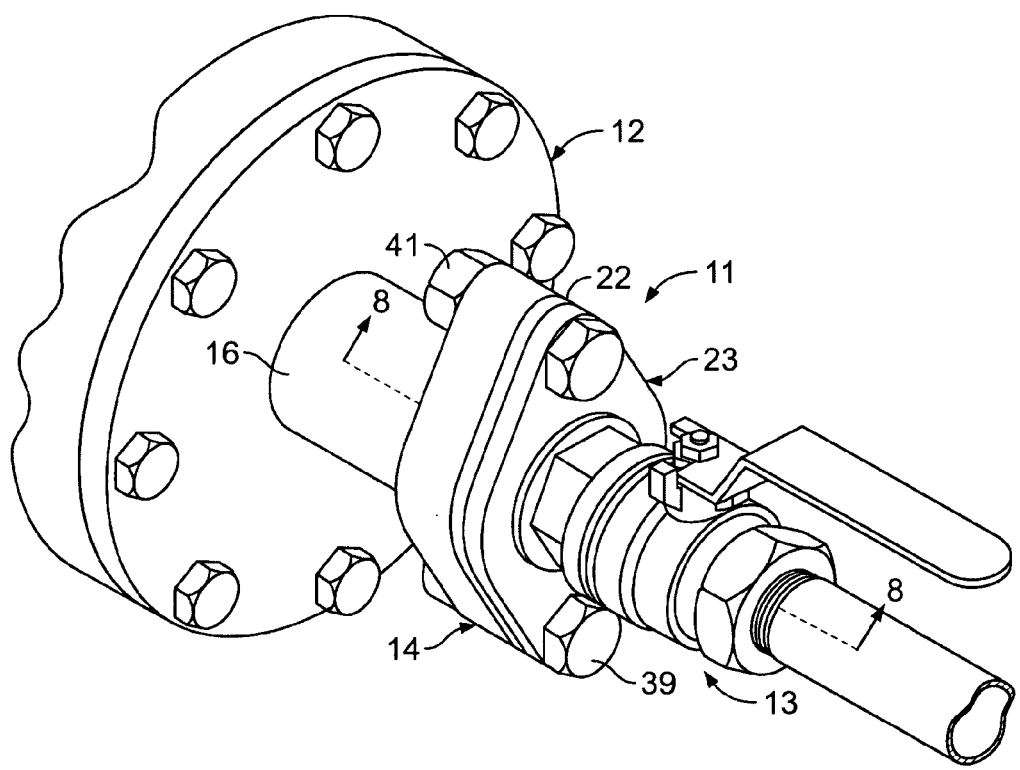
FIG. 1 is a right-front perspective view of a pump, coupling assembly, and valve formed in accordance with an embodiment of the present invention.

Turning now to the drawings, and in particular to FIG. 1, an universal coupling assembly 11 is shown in combination with a pump 12 and a valve 13. In this particular arrangement, the valve 13 serves either to isolate the pump 12 hydraulically for service, or to control the output flow of the pump. However, the coupling assembly 11 and valve 13 may be located at the input of the pump, or employed at the input or the output of other hydraulic devices. Optionally, the coupling assembly 11 may be provided with other types of plumbing or hydraulic devices, such as circulators, flow meters and the like. Optionally, the coupling assembly 11 may be provided as a stand alone unit that has a fixed type of fitting on one end and an universal fitting on the opposite end. Alternatively, the coupling assembly 11 may include universal fittings on both ends thereof.

A line flange 14 is attached to a pump output line 16, which in turn has an upstream end connected to the discharge port of pump 12. Line flange 14 includes a first mating surface 17 and a fluid passageway 18 extending therethrough. Bolt holes 19 and 21 are provided in the upper and lower portions of line flange 14. A gasket 22 is located immediately downstream from the line flange 14 and has one surface in contingent relation with first mating surface 17. Gasket 22 has a size and configuration similar to that of first mating surface 17. A non-conductive resilient material, such as rubber, may be employed for gasket 22.

A fitting member 23 is located downstream from the gasket 22 and the line flange 14. The fitting member 23 is constructed as a flange type fitting, although as explained below, other fitting types may be used in place thereof. As explained below, the coupler housing 31 is configured to have different types of fitting members loaded thereon. In accordance with certain embodiments of the present invention, the fitting member may be any one of flange type fitting, a union type fitting, a sweat type fitting or an NTP type fitting. Any one of the different types of fitting members may be loaded onto a common coupler housing 31. Fitting member 23 includes a second mating surface 24, substantially identical in size and configuration to that of gasket 22. Fitting member 23 also has a central aperture 26 passing therethrough. Aperture 26 has a larger first bore 27 and a smaller second bore 28, forming a lip 29.

The coupling assembly 11 generally includes a coupler housing 31 having an inner bore 31a and an outer perimeter 31c. The inner bore 31a extends along an axis 31d and opens onto a mating end 31b of the coupler housing 31. The coupler housing 31 has an outer coupler flange 32 that extends about the outer perimeter 31c and that is located proximate to the mating end 31b. The coupler housing 31 also has an inner coupler flange 33 that extends about the outer perimeter 31, but is located inward away from the mating end 31b to form a gap 31f between the inner and outer flanges 33 and 32. The inner coupler flange 33 had a periphery 33e that is substantially circular and continues without interruption.

FIG. 7 illustrates an end view of the coupler housing 31 to better show the relation between the periphery 33e of the inner coupler flange 33 and a periphery 32e of the outer coupler flange 32. As shown in FIG. 7, the outer coupler flange 32 has a periphery 32e that follows a predetermined circumferential envelope 32a and has at least one discontinuity 32b to define a blank area 32c in the envelope 32a. The circumferential envelope 32a is generally circular and the discontinuities 32b include at least one flat 34 cut across a portion of the circumferential envelope 32a to define the corresponding blank area 32c. In the exemplary embodiment, the flats 34 are cut as straight lines. Optionally, the flats 34 may be arcuate, concave and the like. In the example illustrated in FIG. 7, the circumferential envelope 32a includes multiple flats 34. For example, pairs of flats 34 are cut across different portions of the envelope 32a to define diametrically opposed blank areas. The envelope 32a has a diameter D1 when measured across a first area that has no discontinuities therein. The envelope 32a has different diameters D2 or D3 by example, both of which are smaller than the diameter d1 in the first area. The diameters D2 and D3 are measured across the envelope 32a in different areas that intersect the discontinuities 32b.

The diameter D1 between the outermost portions of the envelope 32a corresponds to the diameter of the inner coupling flange 33 and is greater or larger than the inner diameter of the aperture 26 through the fitting member 23. The diameters D2 and D3 in areas where discontinuities 32b exist are smaller than the inner diameter of the aperture 26 through the fitting member 23.

Figure 2:
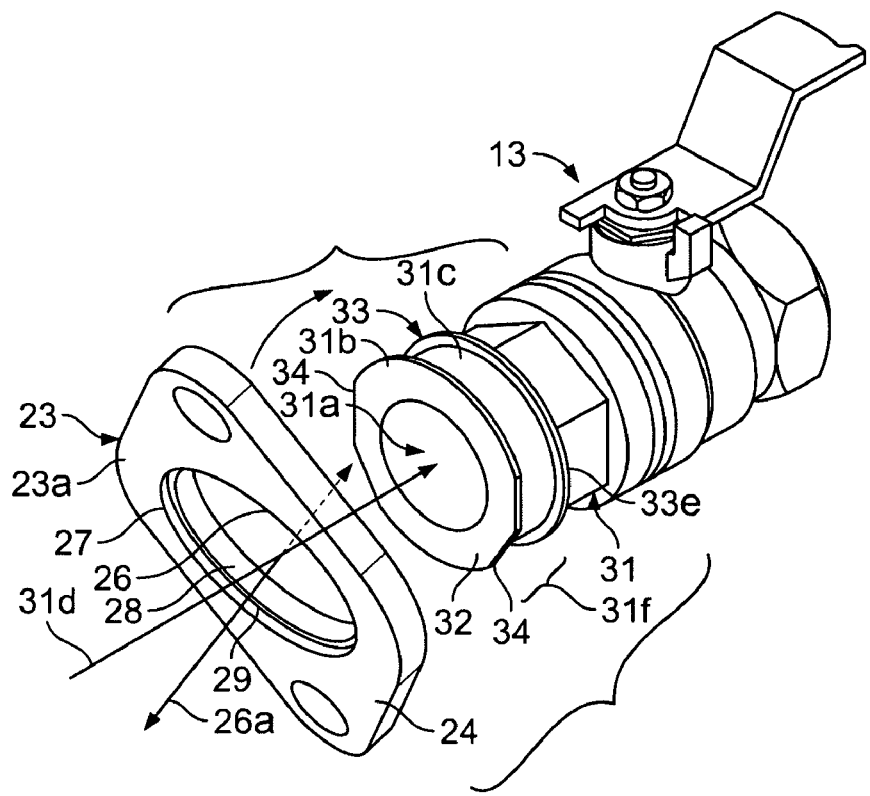
FIG. 2 is a left-front perspective view of the valve coupler and the valve, with the valve flange being installed over one end of the valve coupler in the manner indicated by the arrows.

Returning to FIGS. 2 and 3, the fitting member 23 is loaded over the outer coupler flange 32 onto the outer perimeter 31c of the coupler housing 31 by orienting the flange member 32 in a non-orthogonal relationship with the coupler housing 31 such that the outer coupler flange 32 is able to pass through the aperture 26. More specifically, as shown in FIG. 2, the aperture 26 is centered about a fitting axis 26a. The flange body 23a and the aperture 26 extend along a common plane. The axis 26a is oriented perpendicular to the plane containing the flange body 23a and the aperture 26. The flange body 23a is loaded onto the coupler housing 31 with the plane of the flange body 23a oriented at an acute angle to the axis 31d of the coupler housing 31.

In the present example, it is understood that the outer coupler flange 32 is aligned perpendicular to the axis 31d of the coupler housing 31. However, the outer coupler flange 32 may be oriented to extend about the coupler housing 32 at a non-orthogonal angle to the axis 31d of the coupler housing 31. Regardless of whether the outer coupler flange 32 is oriented perpendicular or non-perpendicular to the axis 31d, during a loading operation, the fitting member 23 is oriented such that the plane along which the aperture 26 extends (e.g. fitting plane) is oriented in a non-orthogonal relation (e.g. an acute angle) to the plane containing the outer coupler flange 32. When the outer coupler flange 32 is oriented perpendicular to the axis 31d of the inner bore 31a, the aperture 26 is tilted such that the fitting axis 26a forms a non-parallel angle to the axis 31d while loading the fitting member 23 onto the outer coupler flange 32.

Figure 3:
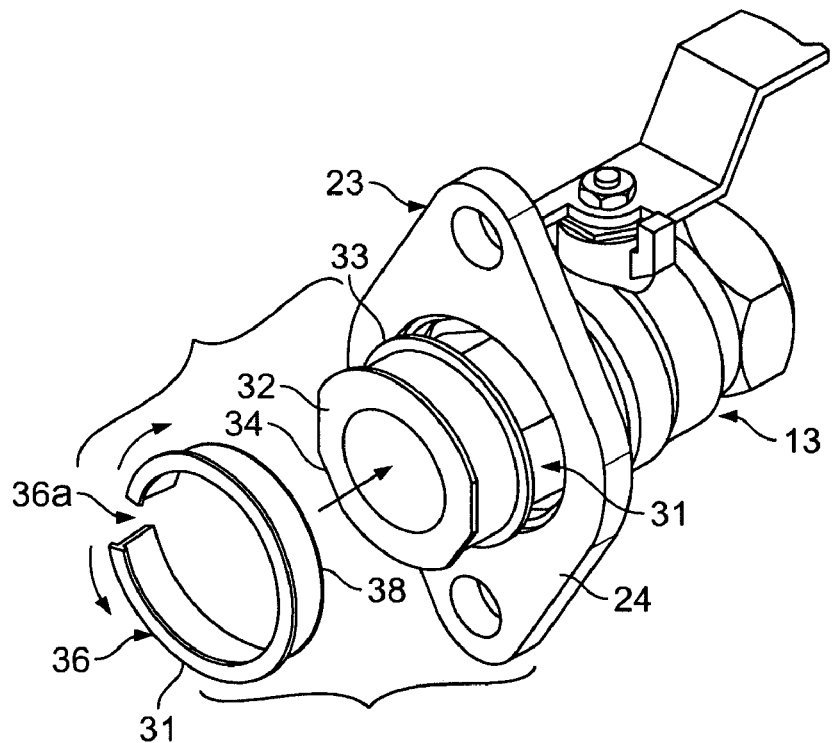
FIG. 3 is a perspective view as in FIG. 2, but with the valve flange installed and the split ring being installed over one end of the valve coupler.
Figure 6:
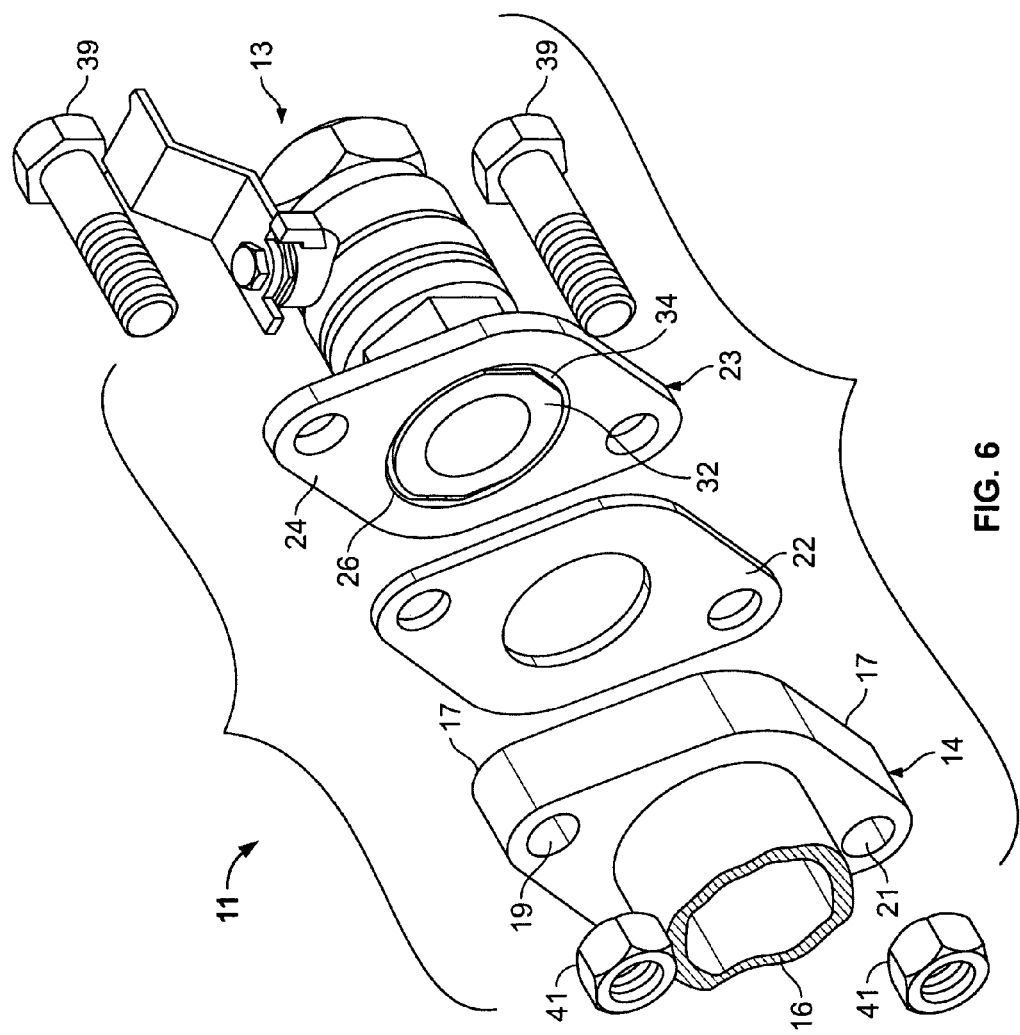
FIG. 6 is an exploded perspective view, showing the assembly of the valve flange, the rubber gasket, the pump flange, the valve coupler and the valve.

The flats 34 reduce the effective diameter of outer coupling flange 32 during the assembly of coupling assembly 11. For example, in FIG. 2, fitting member 23 is shown in the process of being installed over flanges 32 and 33. Providing that the axis of fitting member 23 is not coincident with the axis of the valve coupler 31 during this installation process, the presence of the flats 34 facilitates passage of the fitting member 23 over the larger outer coupler flange 32. This is necessary because if coupler flange 32 were perfectly circular, it would be larger than bore 28 and would prevent the installation of fitting member 23. Therefore, following the installation process described above, fitting member 23 is passed over flanges 32 and 33 and is generally located over the body of valve coupler 31, as shown in FIG. 3.

A substantially non-compressible, non-metallic captive ring 36 is then slipped over outer coupler flange 32, to rest within the annular space or gap 31a defined between the outer and inner coupler flanges 32 and 33. Captive ring 36 may be manufactured from a material that is resistant to plastic flow under compressive forces. By way of example only, such material may include glass fiber, a hard rubber, or a hard plastic. Optionally, the captive ring 36 may be made of conductive materials and/or the same material as the coupler housing 31 and/or the fitting member 23. The inner diameter of captive ring 36 is smaller than the diameter of outer coupler flange 32. Therefore, captive ring 36 may be split at 36a, as shown in FIGS. 3 and 5, to facilitate its installation over outer coupler flange 32.

Figure 8:
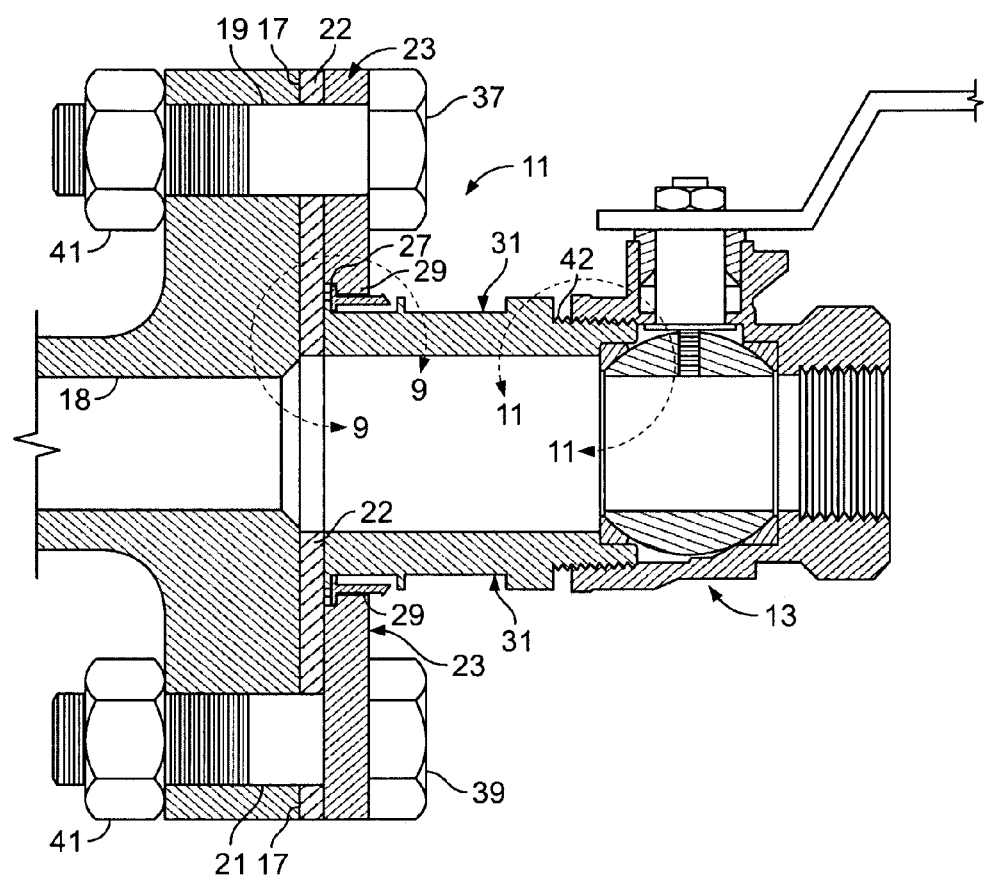
FIG. 8 is a longitudinal, cross-sectional view of the coupling assembly and a valve.
Figure 9:
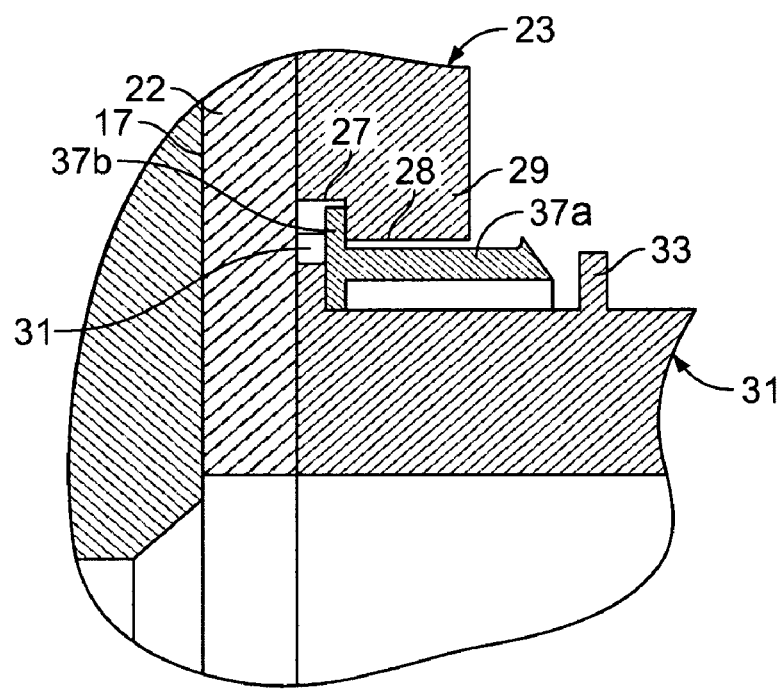
FIG. 9 is a detail inset view, taken on the line 9-9 in FIG. 8.

One configuration for captive ring 36 is generally "T-shaped" in cross-section, as shown particularly in FIG. 4. Thus, after installation of captive ring 36 between outer coupler flange 32 and inner coupler flange 33, a short top portion 37 of the "T" structure lies against the back face of the outer coupler flange 32. (See, FIGS. 8 and 9). The other side of captive ring 36 is provided with a circumferential retainer barb 38. With ring 36 installed, fitting member 23 is moved upstream, so that it lies generally over ring 36. Retainer barb 38 then holds fitting member 23 in place over ring 36.

The outer diameter of the ring 36 is greater than the diameters of the bore 28 and the outer coupler flange 32. Thus, when the fitting member 23 is snugged up against the gasket 22 and the line flange 14, the short top portion of the "T" structure is interposed between the lip 29 and the inner face of the outer coupler flange 32. Means to interconnect fitting member 23 and line flange 14 are provided by bolts 39 and nuts 41. By tightening bolts 39 and 41, fitting member 23 is connected to the line flange 14 with gasket 22 therebetween, compressing the lip 29 against the captive ring 36 and the outer coupler flange 32.

Figure 11:
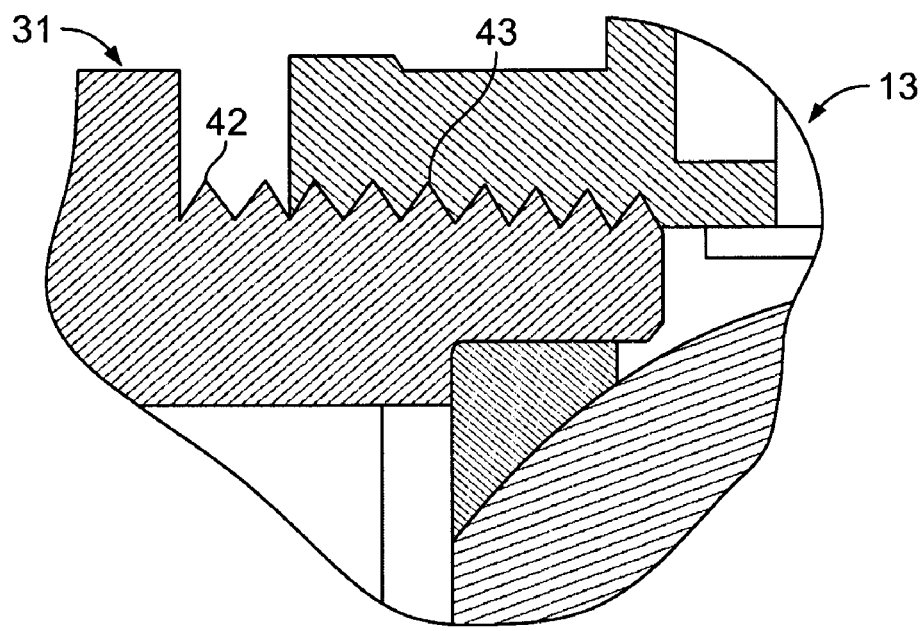
FIG. 11 is a detail inset view, taken on the line 11-11 in FIG. 8, showing a threaded interconnection between the valve coupler and the valve.
Figure 12:
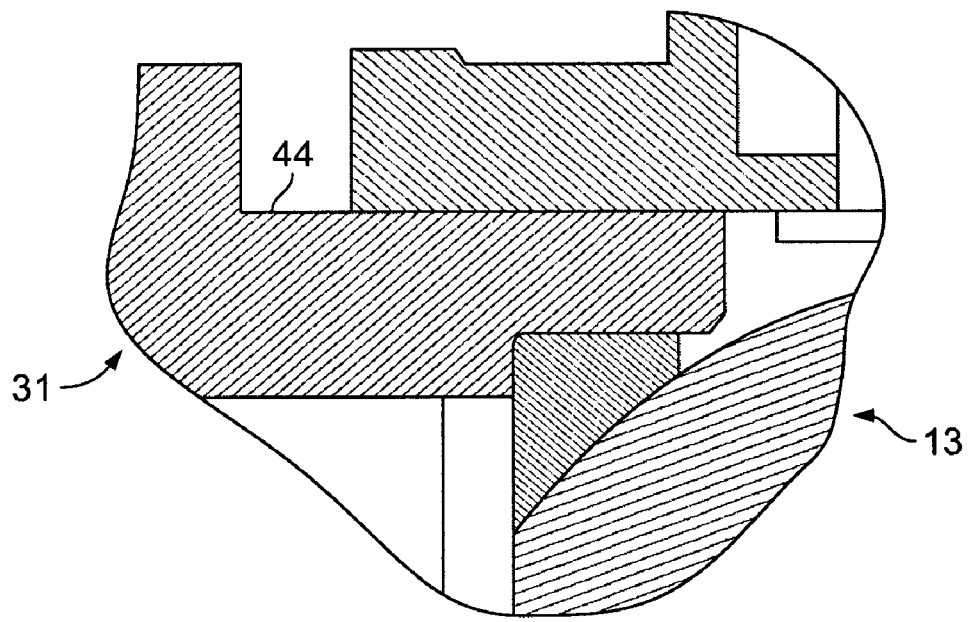
FIG. 12 is a detail inset view, showing an alternative sweat interconnection between the valve coupler and the valve.

External threads 42 are provided around the downstream end of valve coupler 31. Internal threads 43 are provided around the upstream end of valve 13. In this manner, valve 13 is threadably attached to the coupling assembly 11. (See, FIGS. 8 and 11). Alternatively, valve coupler 31 may be provided with a sweat fitting 44, in which case valve 13 may be soldered to coupling assembly 11. (See, FIG. 12).

Figure 10:
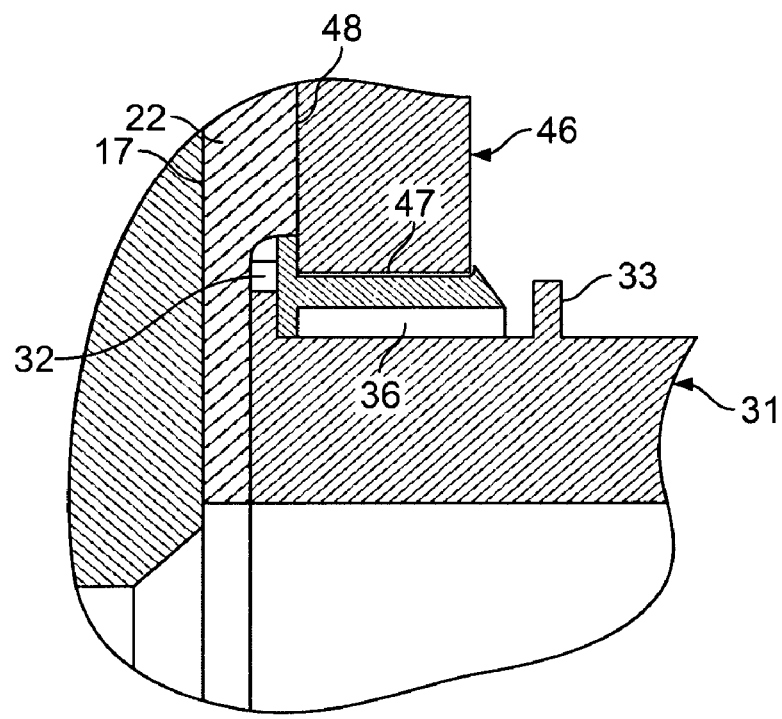
FIG. 10 is a detail inset view, showing an alternative construction for the pump flange which lacks a lip in its central aperture.

An alternative construction for the valve flange is shown in FIG. 10. Valve flange 46 is identical to fitting member 23, except it lacks two bores of different diameters and the attendant lip. Rather, flange 46 includes a single diameter bore 47. The diameter of bore 47 is such that it can pass over inner coupler flange 33 but not over the larger outer coupler flange 32. Thus, flange 46 must be installed from the downstream side of valve coupler 31, prior to the time that the valve 13 is installed. In this construction, when the coupling assembly 11 is bolted together, a second mating surface 48 of the flange 46 compresses against the short top portion of the "T" structure of the ring 36. Ring 36, in turn, compresses against outer coupler flange 32 which partially deforms and intrudes inwardly against gasket 22.

Figure 13:
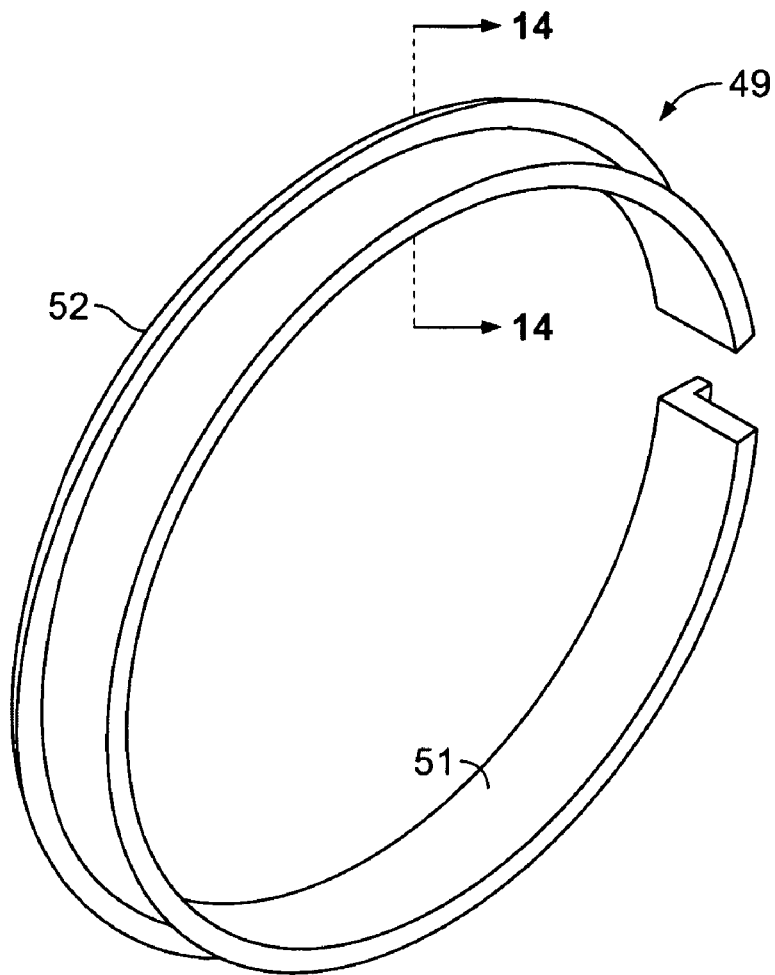
FIG. 13 is a perspective view of an alternative construction for the split ring.
Figure 14:
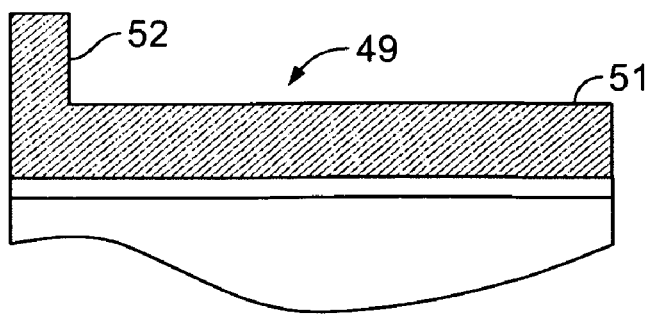
FIG. 14 is a cross-sectional view taken on the line 14-14 in FIG. 13.

Another configuration for the captive ring is shown in FIGS. 13 and 14. Captive ring 49 is "L" shaped in cross-section, having a base portion 51 and a foot portion 52. Captive ring 49 is split in one section, in the same manner and for the same purpose as captive ring 36. Captive ring 49 may be used in connection with the previously discussed valve coupler 31, or with an alternative construction discussed below.

Figure 15:
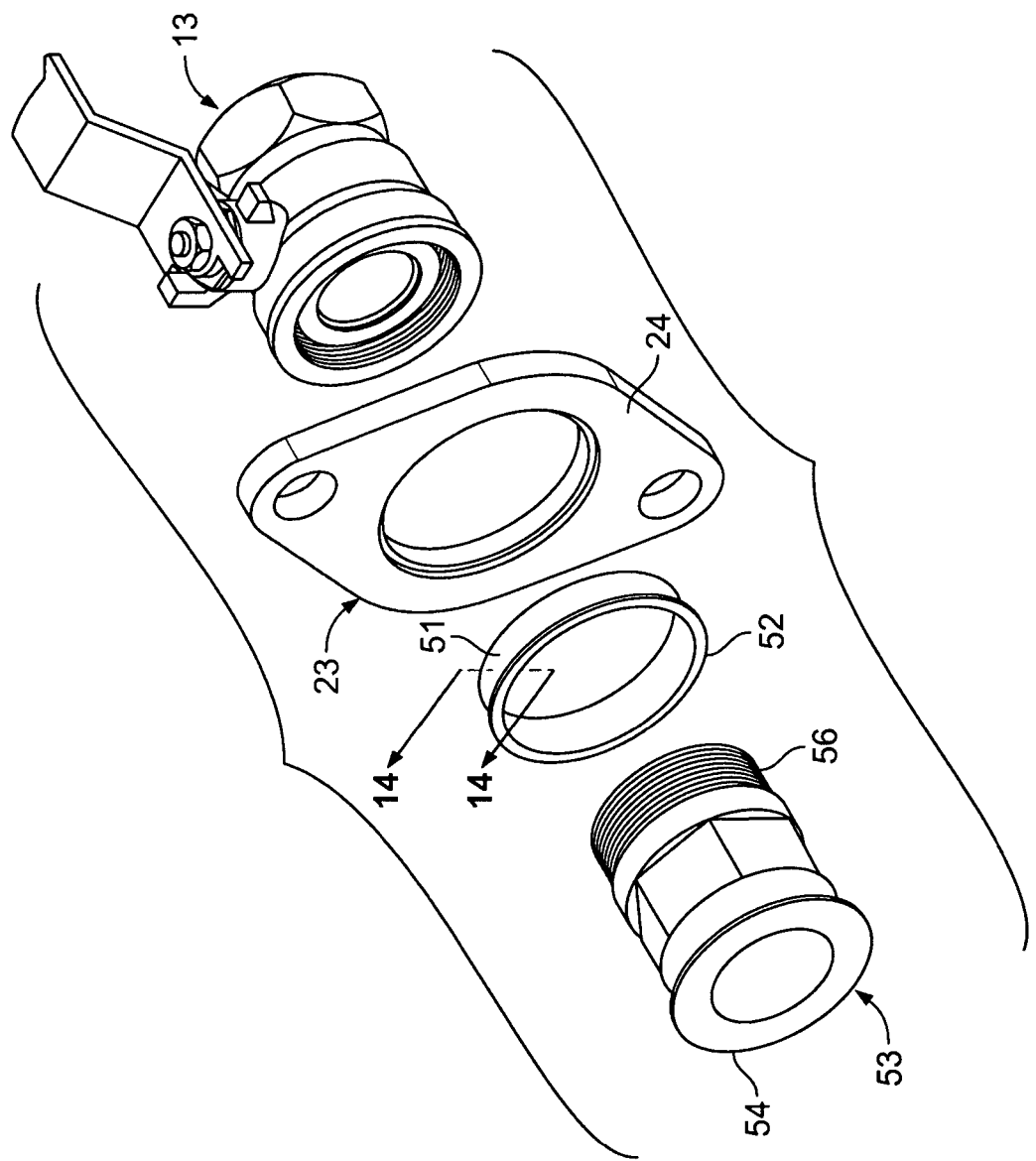
FIG. 15 is an exploded perspective view of an alternative embodiment of the coupling assembly.
Figure 17:
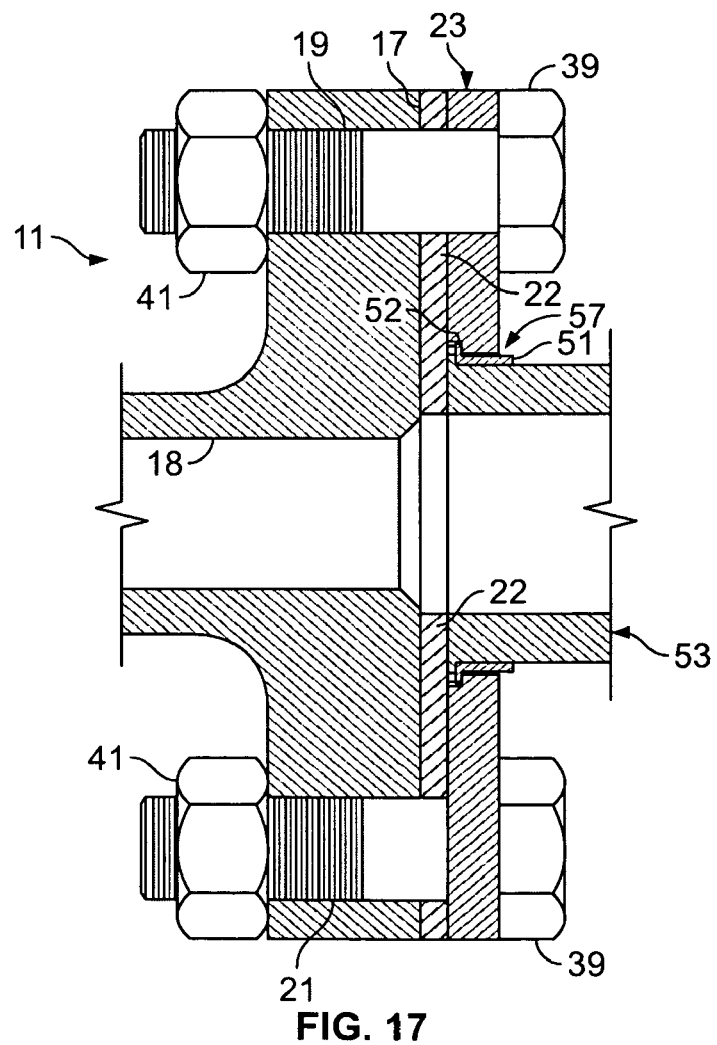
FIG. 17 is a cross-sectional of the alternative embodiment of the coupling assembly shown in FIG. 15.

FIGS. 15 and 17 show alternative constructions both for the captive ring and for the valve coupler employed in the coupling assembly 11. Valve coupler 53 includes a single outer coupler flange 54 on one end, and an externally threaded portion 56 on the other end. Otherwise, valve coupler 53 is identical in features and in function to the previously described valve coupler 31. A captive ring 57 is identical to the previously described captive ring 49, except it is not split. Thus, in the area where cross-sectional views are taken in FIGS. 13 and 15, captive rings 49 and 57 are identical in features.

The inner diameter of captive ring 57 is such that it passes freely over the body of valve coupler 53 from the threaded portion 56 to the rear face of coupler flange 54. Next, fitting member 23 is installed over valve coupler 53, so that it substantially surrounds captive ring 57. In FIG. 17, an assembled coupling assembly 11 incorporating valve coupler 53 and captive ring 57 is shown. As previously explained, bolts 39 and nuts 41 are used to secure the assembly and maintain its components in compressive, sealing relation. A valve 13 is threadably affixed to the threaded portion 56 to complete the system.

Figure 16:
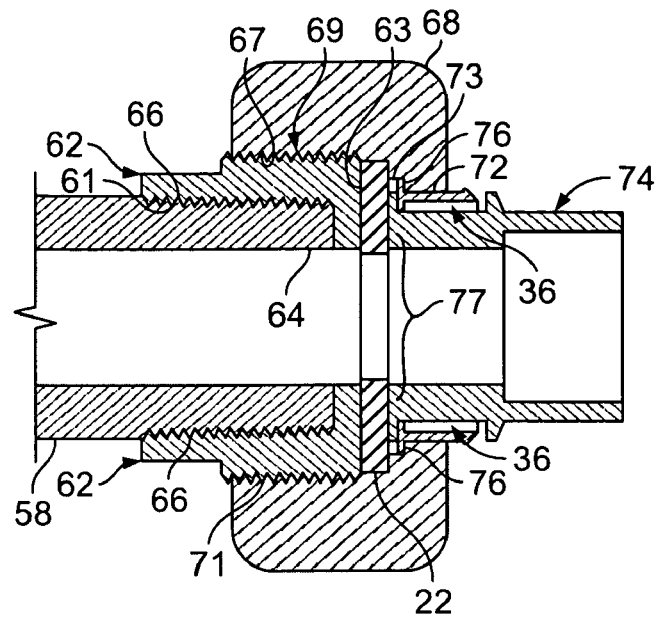
FIG. 16 is a cross-sectional view of an electrolysis-resistant coupling assembly for a fluid line.

Another embodiment of the invention comprises an electrolysis-resistant coupling assembly 58 shown in FIG. 16. Coupling assembly 58 may be used for any application in a fluid line calling for a dielectric coupler. Assembly 58 incorporates many of the features already discussed above, so where common elements are used, the same component numbering scheme will be employed.

Coupling assembly 58 has an inlet line 59 provided with external threads 61, on its downstream end. A line fitting 62, has a first mating surface 63 on one end and a fluid passageway 64 extending therethrough. Line fitting 62 includes inner threads 66 extending inwardly from the other end for coupling to the external threads 61 of the fluid line. Line fitting 62 further includes outer threads 67 extending inwardly over fitting 62, from the first mating surface 63.

Assembly 58 also includes a coupler nut 68 having an aperture 69 extending therethrough. Aperture 69 has inner threads 71 extending inwardly from a first end. Inner threads 71 are adapted for threadably engaging outer threads 67 of line fitting 62. Aperture 69 further includes a lip portion 72, extending inwardly from a second end of coupler nut 68, and a shelf portion 73 between inner threads 71 and lip portion 72.

Assembly 58 further includes a line coupler 74, having an one end provided with a coupler flange 76 having a second mating surface 77. A gasket 22 is provided between and in contingent relation with first mating surface 63 and second mating surface 77. A substantially non-compressible, electrically non-conductive captive ring 36 is provided. Captive ring 36 is interposed between lip portion 72 and coupler flange 76.

In final assembly, coupler nut 68 is rotatably threaded over outer threads 67 of line fitting 62, urging lip portion 72 into compressive relation against captive ring 36 and outer coupler flange 76. The downstream end of line coupler 74 may be threadably or sweat fitted to a downstream line to complete installation of the assembly 58 into a fluid system.

Figure 18:
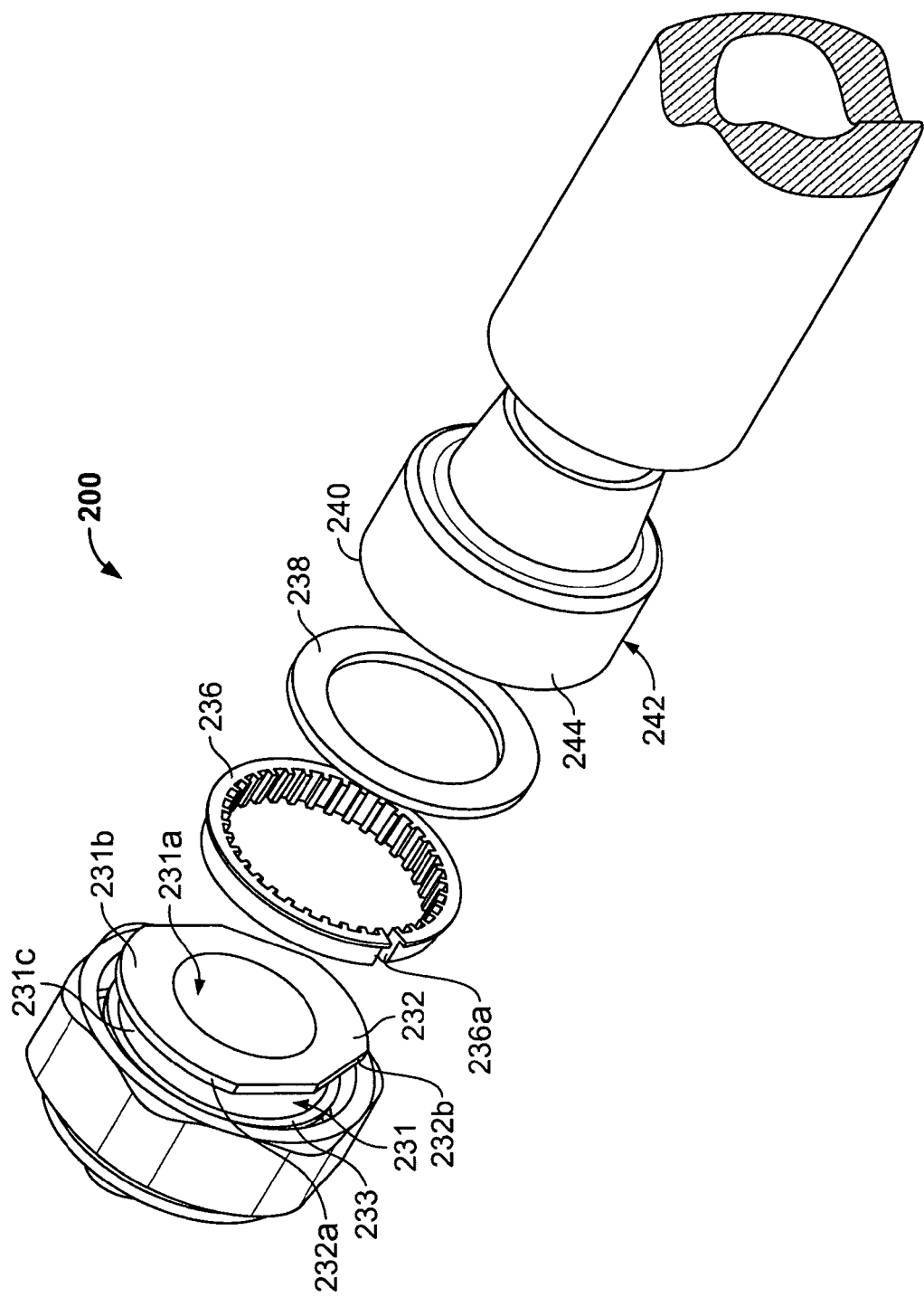
FIG. 18 illustrates a universal fluid coupling assembly formed in accordance with an alternative embodiment.

FIG. 18 illustrates an universal fluid coupling assembly 200 formed in accordance with an alternative embodiment. The coupling assembly 200 of FIG. 18 includes a union type fitting member, in place of a flange type fitting member. The coupling assembly 200 includes a coupler housing 231 having an inner bore 231a that extends along an axis and opens onto a mating end 231b of the coupler housing 231. The coupler housing 231 has an outer perimeter 231c that includes inner and outer coupler flanges 233 and 232 that extend about the outer perimeter 231c. The outer coupler flange 232 is located proximate the mating end 231b. The outer coupler flange 232 has a periphery that follows a predetermined circumferential envelope 232a. The outer perimeter of the outer coupler flange 232 has at least one discontinuity 232b in the circumferential envelope 232a to define a blank area in the envelope 232a.

Figure 19:
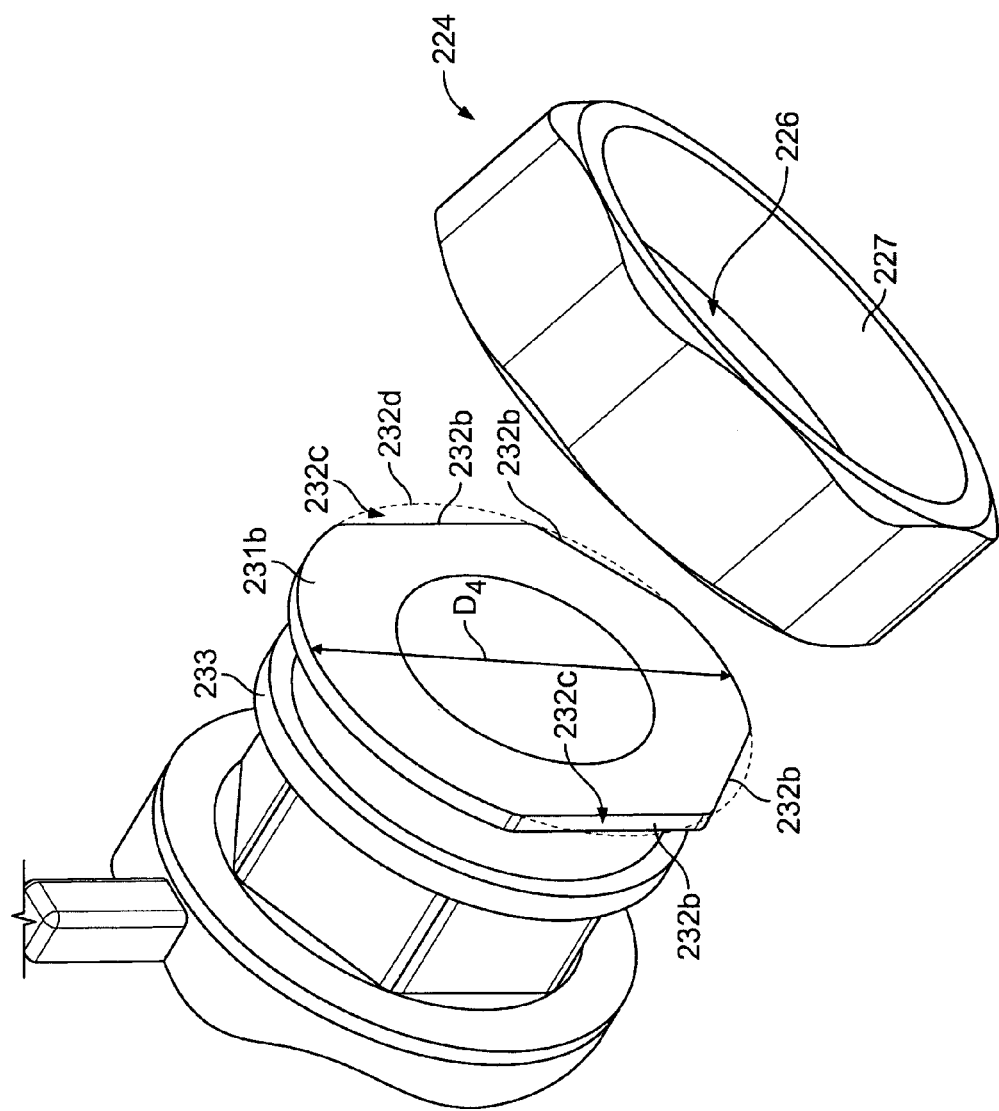
FIG. 19 illustrates an isometric view of the coupling assembly.

FIG. 19 illustrates an isometric view of the coupling assembly 200 in more detail to better illustrate the inner and outer coupler flanges 233 and 232. As shown in FIG. 19, the outer coupler flange 232 includes a circular perimeter 232d (as denoted by dashed lines). The outer perimeter 232d forms an even continuous circle having a constant diameter D4. FIG. 19 illustrates the discontinuities 232b that form blank areas 232c within the outer perimeter 232d.

A fitting member 224 is shown in FIG. 19 tilted at an angle with respect to the mating end 231b of the coupler housing 231. The fitting member 224 has an aperture 226 extending therethrough the aperture 226 is circular and has a diameter that is less than the diameter D4 of the circumferential envelope 232a formed by the outer coupler flange 232. The fitting member 224 is loaded over the outer coupler flange 232 onto the outer perimeter 231c of the coupler housing 231 by orienting the fitting member 224 in a non-orthogonal relation with the coupler housing 231 such that the outer coupler flange 232 passes through the aperture 226. The fitting member 224 includes an interior annular surface 227 that is threaded to form a female union type fitting to be threaded onto a similarly threaded male union fitting. Optionally, the fitting member 224 may have threads on the exterior thereof, to form a male type union.

Return to FIG. 18, the fitting member 224 is shown loaded onto the coupler housing 231 and pulled away from the mating end 231b. FIG. 18 further illustrates a captive ring 236 having a split 236a therein to permit the captive ring 236 to flare outward and to fit over the outer coupler flange 232 and rest in the groove behind the outer coupler flange 232. A seal 238 is provided to rest against the mating end 231b and form a seal between the coupler housing 231 and a front face 240 of a mating male union connector 242. An exterior surface 244 of the male union 242 is threaded to be securely engaged with the threads within the fitting member 224.

It is understood that the union-type fitting member 234 may be loaded onto the coupler housing 31 of FIG. 2, while the flange-type fitting member 24 may be loaded onto the coupler housing 231 of FIGS. 18 and 19. Optionally, the fitting member 224 or 24 may be a sweat-type fitting, an NPT-type fitting and the like.

The fluid coupling assembly can be configured for installation in different fluid distribution systems based on the type of mating coupling. Different types of fitting members what may be selectively mounted on the outer perimeter of the coupler housing. A first fitting member constitutes one of a union-type, a flange-type, a sweat-type and an NTP-type fitting, while the second fitting member may constitute a different one of the union-type, flange-type, sweat-type and NTP-type fitting. Both of the first and second fitting members are configured to be used with the same coupler housing. The first or second fitting member is selected to use with the coupler housing based on the type of mating coupling to be joined thereto. The selected one of the first and second fitting members is then loaded over the outer coupling flange onto the outer perimeter of the coupler housing by first orienting the selected one of the first and second fitting members in a non-orthogonal relationship with the coupler housing to permit the outer coupler flange to pass through the aperture.

After the selected one of the first and second fitting members is loaded onto the coupler housing, a captive ring is then loaded over the outer coupler flange and the selected fitting member is drawn up onto the captive ring to seat the captive ring against the outer coupler flange within the aperture of the fitting member. Optionally, the coupler housing may initially be provided with the one type of fitting member, which is removed from the coupler housing and replaced with a different type of fitting member. To remove the fitting member, it is pushed up onto the coupler housing away from the mating end and the captive ring is removed. Once the captive ring is removed, the fitting member is tilted and unloaded.

While particular elements, embodiments and applications of the present invention have been shown and described, it will be understood, of course, that the invention is not limited thereto since modifications may be made by those skilled in the art. It is therefore contemplated by the appended claims to cover such modifications that incorporate those features which come within the spirit and scope of the invention.

What is claimed is:

1. A fluid coupling assembly, comprising:
   a coupler housing having an inner bore that extends along an axis and opens onto a mating end of the coupler housing, the coupler housing having an outer perimeter that includes a coupler flange that extends about the outer perimeter the coupler flange having a periphery that follows a circumferential envelope and has at least one discontinuity to define a blank area in the envelope;
   a fitting member with a mounting aperture there through, the mounting aperture having an inner diameter that is smaller than the envelope of the coupler flange, wherein the fitting member is mounted over the coupler flange onto the outer perimeter of the coupler housing by orienting the fitting member in a non-orthogonal relationship with the coupler housing such that the coupler flange passes through the aperture in the fitting member; and
   a captive ring loaded over the outer perimeter of the coupler housing, the captive ring being held between the mounting aperture of the fitting member and the outer perimeter of the coupler housing.

2. The assembly of claim 1, the captive ring engaging a back face of the coupler flange and being sealably secured between the coupler flange and fitting member.

3. The assembly of claim 1, wherein the envelope is generally circular and the discontinuity includes at least one flat cut across a portion of the envelope to define the blank area.

4. The assembly of claim 1, wherein the envelope is circular and has a first diameter across a first area that is larger than the inner diameter of the aperture and a diameter across a second area that is smaller than the inner diameter of the aperture.

5. The assembly of claim 1, the captive ring having a cross section with a base portion and a top portion, the base portion fitting over an outer perimeter of the coupler housing and against the coupler flange, the aperture including a rim, the top portion engaging the rim to hold the fitting member on the coupler flange.

6. The assembly of claim 1, wherein the fitting member constitutes one of a flange-type fitting, a union-type fitting, a sweat-type fitting and an NPT-type fitting.

7. The assembly of claim 1, further comprising multiple fitting members, one of the fitting members constituting a flange-type fitting, another of the fitting members constituting one of a threaded union-type fitting, a sweat-type fitting and an NPT-type fitting.

8. The assembly of claim 1, further comprising multiple fitting members, one of the fitting members constituting a threaded union-type coupling, another of the fitting members constituting one of a flange-type coupling, a sweat-type coupling and an NPT-type coupling.

9. The assembly of claim 1, wherein the fitting member has an interior cavity with an open end and with an opposed back wall that includes the aperture there through, the interior cavity being threaded proximate to the open end, the fitting member being loaded over the coupler housing and reoriented in an orthogonal relationship with the coupler housing such that the back wall securely engages the coupler flange when the union member is loaded onto the coupler housing.

10. The assembly of claim 1, wherein the fitting member includes a flange body, the flange body and the aperture extending along a common plane, the flange body being loaded onto the coupler housing with the plane of the flange body oriented at an acute angle to the axis of the coupler housing.

11. The assembly of claim 1, wherein the outer coupler flange is aligned within a coupler plane that is perpendicular to the axis of the coupler housing and the aperture is aligned within a fitting plane, the coupler flange passing through the aperture when the fitting plane is oriented in the non-orthogonal relationship with the coupler plane.

12. The assembly of claim 1, wherein the aperture is centered about a fitting axis and the inner bore is centered about the axis of the coupler housing, the fitting member being oriented such that the fitting axis is aligned at a non-parallel angle to the axis of the coupler housing while loading the fitting member over the coupler flange onto the coupler housing.

13. The assembly of claim 1, wherein the aperture has a larger first bore and a smaller second bore with a lip formed therebetween, the lip receiving and fitting against the coupler flange when the fitting member is loaded onto the coupler housing and oriented in an orthogonal relationship with the coupler housing.

14. The assembly of claim 1, wherein the captive ring is substantially non-compressible and electrically non-conductive, the captive ring being positioned against the coupler flange and interposed between the fitting member and the coupler housing to provide electrical separation between the fitting member and the coupler housing, wherein the fitting member is held against the captive ring.

15. The assembly of claim 1, wherein the captive ring includes an opening therethrough extending along an axis, the captive ring including a base extending axially with respect to the axis and a leg extending radially with respect to the axis, the leg being interposed between the coupler flange and the fitting member.

16. The assembly of claim 1, wherein the captive ring is snapped around the coupler housing and is freely movable with respect to each of the fitting member and the coupler housing.

17. The assembly of claim 1, wherein the captive ring is positioned between the fitting member and the coupler housing such that the captive ring provides complete separation between the fitting member and the coupler housing.

18. The assembly of claim 1, wherein the captive ring is positioned between the fitting member and the coupler housing such that the captive ring extends along an entire axial length of the fitting member between the fitting member and the coupler housing to provide a physical barrier between the fitting member and the coupler housing.

19. The assembly of claim 1, wherein the captive ring has an opening having a diameter that is less than both an outer diameter of the coupler flange and the inner diameter of the fitting member, the captive ring being split to facilitate positioning of the captive ring between the fitting member and the coupler housing.

20. The assembly of claim 1, wherein the captive ring includes a base, a leg extending outward from the base, and a retention barb extending radially outward from the base and spaced apart from the leg, the retention barb and the leg cooperating to retain the fitting member in alignment with the captive ring.

21. A universal fluid coupling assembly, comprising:
a coupler housing having an outer perimeter that includes a coupler flange, the coupler flange having a periphery that follows an envelope and has at least one discontinuity to define a blank area in the envelope;
a flange-type fitting with an aperture there through, the aperture having an inner diameter that is smaller than the envelope of the coupler flange;
a threaded union-type fitting with an aperture there through, that has an inner diameter that is smaller than the envelope of the coupler flange, wherein a selected one of the flange-type and union-type fitting is mounted over the coupler flange onto the outer perimeter of the coupler housing by orienting the selected one of the flange-type and union-type fitting in a non-orthogonal relationship with the coupler housing such that the coupler flange passes through the corresponding aperture; and
a captive ring loaded over the outer coupler flange, the captive ring engaging a back face of the coupler flange and being secured between the selected one of the flange-type and union-type fitting and the coupler flange.

22. The assembly of claim 21, wherein the union-type fitting has an interior cavity with an open end and with an opposed back wall that includes the aperture there through, the interior cavity fitting being threaded proximate to the open end, the union-type fitting being loaded over the coupler housing and reoriented in an orthogonal relationship with the coupler housing such that the back wall securely engages the coupler flange when the union-type fitting is loaded onto the coupler housing.

23. The assembly of claim 21, wherein the flange-type fitting includes a flange body, the flange body and the aperture extending along a common plane, the flange body being loaded onto the coupler housing with the plane of the flange body oriented at an acute angle to the axis of the coupler housing.

24. The assembly of claim 21, wherein the captive ring is a substantially non-compressible and electrically non-conductive captive ring, the captive ring being positioned against the coupler flange and interposed between the coupler housing and the selected one of the flange-type and union-type fitting to provide electrical separation between the coupler housing and the selected one of the flange-type and union-type fining, wherein the selected one of the flange-type and union-type fitting is held against the captive ring.

25. The assembly of claim 21, wherein the captive ring includes an opening therethrough extending along an axis, the captive ring including a base extending axially with respect to the axis and a leg extending radially with respect to the axis, the leg being interposed between the coupler flange and the selected one of the flange-type and union-type fitting.

26. The assembly of claim 21, wherein the captive ring extends along an entire axial length of the selected one of the flange-type and union-type fitting between the coupler housing and the selected one of the flange-type and union-type fitting to provide a physical barrier between the coupler housing and the selected one of the flange-type and union-type fitting.

27. The assembly of claim 21, wherein the captive ring includes a base, a leg extending outward from the base, and a retention barb extending radially outward from the base and spaced apart from the leg, the retention barb and the leg cooperating to retain the selected one of the flange-type and union-type fitting in alignment with the captive ring.

28. A method of configuring a fluid coupling assembly for installation into a fluid distribution system based on a type of mating coupling, the method comprising:
providing a coupler housing having an inner bore that extends along an axis and opens onto a mating end of the coupler housing, the coupler housing having an outer perimeter that includes a coupler flange that extends about the outer perimeter, the coupler flange having a periphery that follows a circumferential envelope and has at least one discontinuity to define a blank area in the envelope;
providing first and second fitting members each having an aperture there through, the apertures each having an inner diameter that is smaller than the circumferential envelope of the coupler flange, the first fitting member constituting one of a union-type fitting, a flange-type fining, a sweat-type fitting and an NPT-type fitting, the second fitting member constituting a different one of the union-type fitting, the flange-type fitting, the sweat-type fitting and the NPT-type fining, wherein both of the first and second fitting members are configured to be used with the coupler housing;
selecting one of the first and second fitting members for use with the coupler housing based on the type of mating coupling to be joined thereto;
mounting the selected one of the first and second fitting members over the coupler flange onto the outer perimeter of the coupler housing by orienting the selected one of first and second fitting members in a non-orthogonal relationship with the coupler housing as the coupler flange passes through the corresponding aperture;
after the selected one of the first and second fitting members is loaded onto the coupler housing, loading a captive ring over the coupler flange; and
drawing the selected one of the first and second fitting members up onto the captive ring to seat the captive ring against the coupler flange and in the corresponding aperture.

29. The method of claim 28, further comprising forming the circumferential envelope to be generally circular and the discontinuity to include at least one flat cut across a portion of the circumferential envelope to define the blank area.

30. The method of claim 28, wherein the selected one of the first and second fitting members is a union-type fitting that has an interior cavity with an open end and with a back wall that includes the aperture therethrough, the union-type fitting being threaded proximate to the open end, the union-type fitting being loaded over the coupler housing such that the back wall securely engages the coupler flange when the union-type fitting is loaded onto the coupler housing and oriented in an orthogonal relationship with the coupler housing.

31. The method of claim 28, further comprising removing, from the coupler housing, the second fitting member which is a flange-type fitting that has a flange body, the flange body and the mounting aperture extending along a plane, the flange body being unloaded from the coupler housing with the plane of the flange body oriented in a non-orthogonal relation with the axis of the coupler housing.

32. The method of claim 28, further comprising, after loading the selected one of the first and second fitting members onto the coupler housing, orienting the selected one of the first and second fitting members and the coupler housing in an orthogonal manner to one another to prevent the selected one of the first and second fitting members from being removed over the coupler flange.

33. The method of claim 28, further comprising removing the first fitting member from the coupler flange and mounting the second fitting member over the outer coupler flange in order to switch between first and second types of fittings.

34. The method of claim 28, wherein said loading a captive ring over the coupler flange further comprises loading a captive ring over the coupler housing that is substantially non-compressible and electrically non-conductive such that the captive ring is positioned against the coupler flange and interposed between the coupler housing and the selected one of the flange-type and union-type fitting to provide electrical separation between the coupler housing and the selected one of the flange-type and union-type fitting.

35. The method of claim 28, wherein said loading a captive ring over the coupler flange further comprises loading a captive ring over the coupler housing, the captive ring having a base extending axially with respect to the axis and a leg extending radially with respect to the axis over the coupler flange; and wherein said drawing the selected one of the first and second fitting members up onto the captive ring further comprises drawing the selected one of the first and second fitting members up onto the captive ring such that the leg is interposed between the coupler flange and the selected one of the flange-type and union-type fitting.

36. The method of claim 28, wherein said loading a captive ring over the coupler flange further comprises loading a captive ring over the coupler housing, the captive ring having a base, a leg extending outward from the base, and a retention barb extending radially outward from the base and spaced apart from the leg; and wherein said drawing the selected one of the first and second fitting members up onto the captive ring further comprises drawing the selected one of the first and second fitting members up onto the captive ring such that the selected one of the flange-type and union-type fitting is positioned between the leg and the barb to retain the selected one of the flange-type and union-type fitting in alignment with the captive ring.

* * * * *